Figure 1:
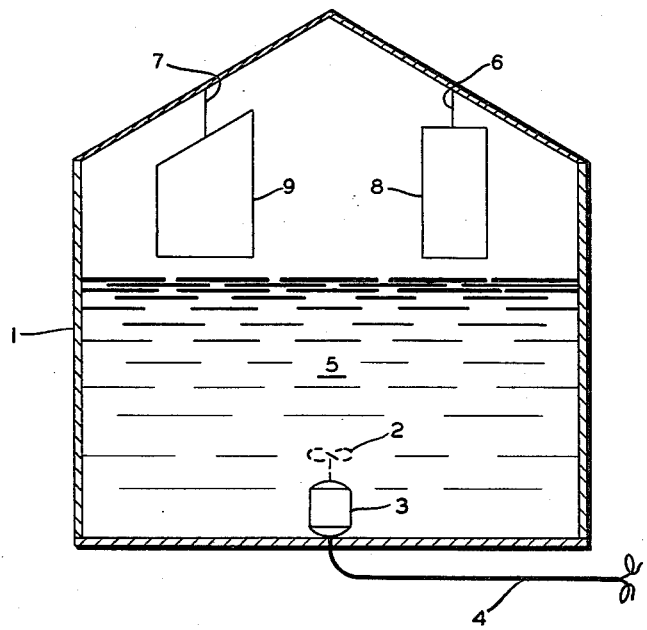

June 7, 1960 P. L. GOMORY 2,939,294
MINIMIZING VAPOR LOSSES FROM STORAGE TANKS
Filed Sept. 12, 1955

INVENTOR.
P.L. GOMORY
BY
Hudson & Young
ATTORNEYS

# United States Patent Office 2,939,294
Patented June 7, 1960

2,939,294

MINIMIZING VAPOR LOSSES FROM STORAGE TANKS

Paul L. Gomory, Bethesda, Md., assignor to Phillips Petroleum Company, a corporation of Delaware Filed Sept. 12, 1955, Ser. No. 533,839

3 Claims. (Cl. 62—54)

This invention relates to the reduction of vapors lost from readily vaporizable liquids while said liquids are being handled as in a storage tank or other vessel. In one of its aspects, the invention relates to minimizing loss of vapors from liquids in storage tank by maintaining above said liquids a stagnant or substantially quiescent blanket or layer of vapors while at the same time imparting a motion to the body of liquid to cause cooler portions from within the body of the liquid to move to the outer surfaces thereof, and by such exchange of position between the warmer liquid at said surfaces with the cooler liquid from within the body of liquid thus produced, maintain the outer surfaces of the body of the liquid at a temperature which is substantially lower than the liquid in said outer surfaces would have were the liquid also allowed to remain quiescent, thereby reducing the vapor pressure of the liquid at its surfaces. In another of its aspects, the invention relates to a storage tank for storing liquids in which there is provided in the vapor space thereof means to maintain the vapor in the vapor space thereof substantially quiescent while there is imparted a motion to the liquid as has been described herein.

It is known that rather large quantities of volatile liquids, for example, crude oils, gasolines, solvents of various kinds, which readily vaporize upon being heated, are stored in tanks which are subject to receiving heat at some time during each 24-hour period or day. Usually, during the day time when the sun is shining, a storage tank will receive heat from the sun and will transmit said received heat through its walls into the stored liquid. As the temperature of the stored liquid rises, so will its vapor pressure. Vapors which are released due to the increase of vapor pressure of the liquid will accumulate in whatever vapor space exists above the liquid in the tank. Ordinarily, a pressure is reached beyond which it is unsafe to go in view of the rather large surfaces of tank wall which are readily collapsible beyond a few pounds pressure. When such unsafe pressures are likely to be reached, tanks of the character here discussed, which are well-known to those skilled in the art of storing readily vaporizable or volatile liquids, are vented in one manner or in another. Likewise, when the contents of such a tank are cooled as at night time, or when sudden drops of atmospheric temperature are experienced, there is a tendency for vapors in the vapor space to condense, resulting sometimes in a vacuum or suction, which, in any event, is in terms of absolute pressure, lower than that prevailing outside of the tank. Again, it is necessary to vent the tank, this time in reverse direction, that is, it is necessary to allow air to be sucked into the tank to avoid collapse of its walls. This venting procedure results in a gradual replacement of vapors with air and in any event, in a loss of vapors from the tank to the outside atmosphere. Such vapors are, of course, blown away and are a total loss. Heretofore, it has been considered uneconomical to collect and to somehow make use of vapors emanating from such tanks, as a general rule.

It is an object of the present invention to provide a method and apparatus for maintaining a storage tank under such conditions when it is receiving heat from the outside that liquid therein will be maintained at a temperature which is sufficiently low to considerably minimize the formation of vapors at its surfaces. It is another object of the present invention to provide a method and means for storing volatile liquids, the said method and means being characterized by their relative simplicity, ease of operation, and economical design. Other aspects, objects, and the several advantages of the invention are apparent from the study of this disclosure, the drawing, and the appended claims.

According to a basic concept of this invention, there is made a recognition of the fact that the vapors above a liquid in a storage tank, though they may be at a considerably higher temperature than the liquid therein, will contain, relatively speaking, but a small quantity of heat. Furthermore, according to another basic concept of this invention, there is made a recognition of the fact that if the vapors within a tank are allowed to rise in temperature at a time when heat is being received from the outside of the tank, there will be a reduction of the temperature differential between the tank top and walls and the vapor in contact therewith which, on the basis of ordinary heat transfer knowledge it will be realized will reduce the total amount of heat flowing into the said vapors. A combination of these concepts leads to another basic concept of this invention which is that the vapors above a liquid in a storage tank or other vessel shall be maintained substantially in a quiescent state to encourage the said vapors to increase in temperature when heat is transmitted to them from without the tank. A still further basic concept of this invention, which is based upon the foregoing concepts, is to move the liquid in the tank in a manner such that the hotter portions of liquid at the surfaces of the body of the liquid (and these surfaces include not only the top surface but side surfaces) will be moved from their position at the surface of the body of liquid into the liquid and be replaced by cooler liquid from within the body of the liquid. Clearly, in view of the concepts of the invention, it is believed now realizable that the large body of liquid will have a considerably higher heat capacity at a certain temperature than will the vapors. Therefore, it is feasible according to the concepts based upon which this invention has been set forth to remove from the surfaces of the liquid to within the body of the liquid portions of warmer liquid and to continue to do so, always replacing the warmer liquid with cooler liquid, without substantially raising the temperature of the overall body of liquid while maintaining substantially quiescent the relatively low heat content vapors above the liquid as a blanket or insulating layer to prevent the much greater heat inflow which would occur to the liquid if the vapors were allowed to be in motion or if the liquid were placed into intimate contact with the vapors as by spraying the liquid into said vapors or pumping the said vapors into the liquid. It is, of course, recognized that where there is a cooler body of liquid with vapors thereabove, it is possible to cool the said vapors and consequently liquid in contact with the said vapors by spraying cooler portions of the liquid from the bottom of the tank into the vapor space above the liquid. Likewise, it is, of course, recognized that it is possible to cool the vapors which are extant above a body of liquid by causing the said vapors to be pumped or otherwise circulated into the cooler portion of the body of liquid therebelow. Such a modus operandi, however, is to be distinguished from the modus operandi of the present invention. It will be understood by those skilled in the art in possession of this disclosure that since the invention here is based upon concepts which are, in a sense, different in their application from the concepts of the said methods in which the vapors and liquid are more intimately contacted, that there is made here no attempt to discuss the relative merits of the two systems.

According to the present invention, therefore, there have been provided a method and means for storing a volatile or readily vaporizable liquid which comprises maintaining a quiescent or relatively stagnant blanket of vapors in contact with the surface of said liquid while mildly moving said liquid. In one embodiment of the invention, the vapors are maintained in substantially quiescent state while the liquid is circulated from a point within the cooler portions of the body of liquid to the side and upper surfaces thereof in substantially what might be termed a streamline flow following the path from a central portion of the liquid to its sides and across the top toward the center and down again. In one embodiment of the apparatus according to the invention, vanes are provided within the vapor space of the tank so that the vapor in the said vapor space will not pick up any motion from the liquid in the bottom of the tank when said liquid is being circulated. When vanes are provided, the vanes can be extended by rods or tubes from the top or sides of the tank and rods or tubes and even the vanes can be made of substantially low heat-conducting or high heat-conducting material as desired and as will be found most advantageous in the particular application of the invention. Thus, if it is desired to quickly raise the temperature of a relatively small quantity of vapors, the vanes and supporting rods might well be made of high heat-conducting material. On the other hand, if it is desired to avoid transmission of heat to the vapors as far as this is possible in the ordinary storage tank, then the vanes will, as stated, be removed from the top and sides of the storage tank and will be made of low heat-conducting material and in such a case, the supporting rods, struts, or other members can be made of the same relatively low heat-conducting material.

From the foregoing and from that which follows, it will be understood by one skilled in the art in possission of this disclosure that the temperatures of the vapor and liquid in a storage tank may be quite different at given times. For example, when the sun is rapidly rising on a rather hot day, more especially when the air temperature is also rapidly rising, it is possible for the vapors to very quickly reach a rather high temperature in view of their low heat capacity. While this is occurring, the liquid, due to its higher heat capacity, and further due to its higher usual volume, can absorb considerably larger quantities of heat without substantial rise in temperature. If, therefore, during the night the liquid has lost heat, as it usually will, the inner portions thereof can be relied upon to supply the cooling effect for the outer surfaces thereof. If desired, as will be understood by those skilled in the art in possession of this disclosure, the liquid may have been circulated during the night to transmit to its inner relatively possibly warmer portions liquid which has cooled at the surfaces thereof. The precise temperature condition prevailing in the vapor and in the liquid and their relative values at any given time are not important to a consideration of the operation of this invention except to note that the type of circulation provided for by this invention is to be accomplished in such a manner as to provide the described vapor blanket and to thereby reduce the ΔT between the tank walls and the vapor on the one hand and the transfer of heat from the vapors to the liquid on the other resulting in a rise of temperature of its surface by removing the liquid at the surfaces of the body of liquid also as described herein. Therefore, the precise moment when circulation shall be begun or interrupted, at least for the time being, will depend upon a consideration of the relative sizes of the vapor and liquid masses and their relative temperatures. This will be readily understood by one skilled in the art in possession of this disclosure. However, in order to more clearly set forth the invention, the following is noted. It has been noted that during the hot part of the day, when the sun is shining, the surface of the tank becomes very hot and heat is transferred into the tank. Thus, as noted, the temperature of the vapors will increase very much more rapidly than that of the liquid. This may be due in part to the area of tank surface in contact with the vapors which may be considerably larger than the area of the surface of the tank in contact with the liquid. It may also be due to the angle at which the sun shines on the top of the tank as distinguished from the side of the tank. Obviously, liquid is not in contact with the top of the tank, and, of course, the quicker rise in temperature of the vapors is also due to the lower heat capacity thereof relative to the heat content of the liquid. The best times to circulate according to the invention and the durations of circulation, while maintaining a stagnant or substantially quiescent blanket of vapors above the liquid can be determined experimentally for each specific set of conditions, the conditions including such variables as the nature of the liquid which will affect its heat content and that of its vapors, the nature and position of the storage tank and the extent to which it is filled with liquid on the one hand and vapor on the other. Ordinarily, the invention contemplates that the modus operandi thereof will be effected during that part of the day when there is a tendency for heat to flow into the tank from without the tank. Effecting the operation of the invention at such times, or at other times, does not preclude effecting other operations at times when the invention is not being used. Thus, it may be desirable to actively agitate the contents of the tank to cool the entire tank during the night time in order to accumulate a sufficient cooling capacity in the liquid in the tank to be able to supply the same during the ensuing day or days as the case may be when there is a rather cool night suddenly occurring after several rather warm ones and the cooling capacity of the liquid has been substantially exhausted.

Figure 2:
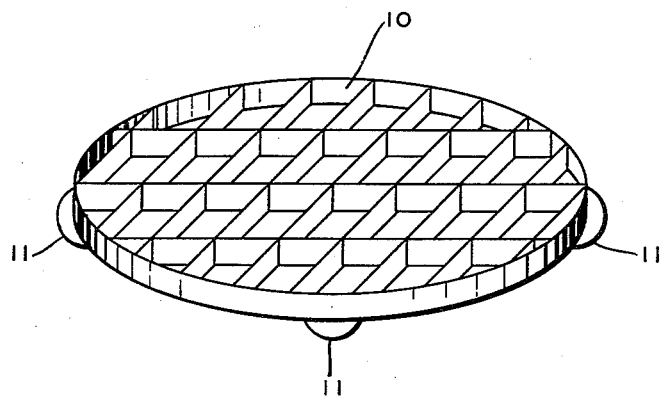

Figure 1 shows a tank according to the invention and Figure 2 shows an arrangement which serves to prevent motion of the vapors above the liquid body in a tank, according to the invention.

Referring now to the drawing, there is provided in storage tank 1 an impeller 2 driven by motor 3 supplied with electrical energy by way of conduit 4. The impeller is so designed and positioned in the bottom of the tank that it will cause a substantially streamline flow of warm liquid upwardly along the sides of the tank across the top toward a central position thereof and down through the body of the liquid therein. Thus, liquid 5 is caused to move gently from peripheral portions of its body to central portions thereof. If desired, the flow pattern can be different from that described. For example, it can be such that the liquid which has warmed somewhat at the outer portions of the body of the same will be drawn off from the top of the body and from the sides thereof by operating impeller to move the liquid upwardly through the central portion of the liquid and down along the sides and across the bottom thereof. Furthermore, more than one impeller or other means for causing the motion of the liquid can be employed. Also, the impeller or impellers, or other means, can be positioned at various places in the tank to accomplish the precise flow pattern desired. Suspended by means of rods 6 and 7 are plates 8 and 9. Plates 8 and 9 serve to prevent motion of the vapor in the vapor space above liquid 5. If desired, the plates can have various shapes as suggested by the shapes shown for plates 8 and 9. Still other shapes can be employed. Furthermore, the plates can be maintained in the tank by means other than suspension means. Thus the plates can be arranged to float on the top of the liquid if desired. In such event, the arrangement of the plates will be such that they will be selfspacing. This can be accomplished by providing bars or feelers between plates attached to, at least, one of them. Such feelers or bars have not been shown for sake of simplicity. It will be understood by one skilled in the art in possession of this disclosure that plates 8 and 9 are diagrammatically shown. Furthermore, it will be understood that a large tank may have a large number of such plates. For example, it is within the scope of the disclosure and the appended claims to employ an ice-cube tray-type network of substantially vertical plates. In such event, the network of plates need not be of great depth and can be arranged to float in the surface of the liquid. In this manner, the vapor nearest the liquid will remain substantially stagnant in view of the large number of square or other shaped holes in the network which are thus provided. Such a network is considered to be a feature of the invention and is illustrated in Figure 2 in which the cross-hatched or cross-connected plates 10 are supported on floats 11. The plates and floats can be made of low heat-conducting material, such as "Marlex 50" which is a strong, hard, machineable type of polyethylene. Various other materials of construction, as well as arrangements of baffling systems for the tank, according to the invention, can be devised by those skilled in the art in possession of this disclosure.

As examples of liquids which can be stored in storage tanks, there are given those with which the present inventor is primarily concerned, though not exclusively, namely, hydrocarbon liquids such as gasolines, crude oils and fractions thereof, liquefied petroleum gases, various chemical reagents and solvents such as aqua ammonia chlorinated hydrocarbons, etc.

*Example*

A storage tank having substantially the design and construction as illustrated in the drawing attached to this disclosure is filled three-quarters full of gasoline. By observing temperatures and recording them and comparing the recorded temperatures for a circulated tank as against the tank when the impeller is not moved during the day time, it is noted that the temperature to which the surfaces of the oil rises when the tank is being circulated according to the invention is lower than that to which it rises when the tank is not circulated also during the day time.

Reasonable variation and modification are possible within the scope of the foregoing disclosure, the drawing, and the appended claims to the invention, the essence of which is that a volatile liquid is so handled that there is maintained above the same a substantially quiescent or stagnant vapor space while the liquid is caused to have a slight or streamline motion to move liquid from the surfaces of the body of the liquid to the inner portions thereof, thus moving cooler portions of the liquid from within the body of the liquid to the outer portions thereof whenever heat is flowing into the container in which the liquid is being handled or stored.

I claim:

1. Storage apparatus for vaporizable liquids comprising a tank adapted to hold a liquid, said tank having a cover to maintain vapors in a region above liquid stored in said tank, means disposed within said tank to move liquid from a lower region thereof to an upper region within the body of liquid in the tank, and baffle means comprising a plurality of spaced plates extending in generally vertical planes within the upper region of the tank to prevent horizontal flow of vapors in the upper region of said tank.

2. The apparatus of claim 1 wherein said means to move liquid comprises an impeller.

3. The apparatus of claim 1 wherein said baffle means are of such configuration as to be free to float on the surface of a liquid positioned in said tank.

References Cited in the file of this patent

UNITED STATES PATENTS

| 1,136,230 | Holmes | Apr. 20, 1915 |
| 1,715,545 | Epstein | June 4, 1924 |
| 1,807,108 | Tontet | May 26, 1931 |
| 2,156,096 | Robinson | Apr. 25, 1939 |
| 2,188,475 | Heinrich | Jan. 30, 1940 |
| 2,229,081 | Hansen | Jan. 21, 1941 |
| 2,293,263 | Kornemann | Aug. 18, 1942 |
| 2,416,924 | Jones | Mar. 4, 1947 |
| 2,468,389 | Auer | Apr. 26, 1949 |
| 2,470,551 | Fish | May 17, 1949 |
| 2,539,148 | Malir | Jan. 23, 1951 |
| 2,576,050 | Soden | Nov. 20, 1951 |
| 2,703,966 | Snelson | Mar. 15, 1955 |
| 2,717,493 | Fike | Sept. 13, 1955 |

FOREIGN PATENTS

| 57,354 | France | Oct. 8, 1952 |